(12) United States Patent
Choi et al.

(10) Patent No.: US 9,040,118 B2
(45) Date of Patent: May 26, 2015

(54) METHOD OF MANUFACTURE OF STYRENE-BUTADIENE LATEXES

(75) Inventors: Ho-yeul Choi, Daejeon (KR); Seung-uk Yeu, Daejeon (KR); Seung-hun Yang, Gongju-si (KR); Chang-sun Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 2184 days.

(21) Appl. No.: 10/553,586

(22) PCT Filed: Feb. 12, 2004

(86) PCT No.: PCT/KR2004/000279
§ 371 (c)(1),
(2), (4) Date: Oct. 17, 2005

(87) PCT Pub. No.: WO2005/105898
PCT Pub. Date: Nov. 10, 2005

(65) Prior Publication Data
US 2006/0263602 A1    Nov. 23, 2006

(30) Foreign Application Priority Data
Jun. 27, 2003  (KR) ................ 10-2003-0042582

(51) Int. Cl.
| | | |
|---|---|---|
| *C09J 155/00* | (2006.01) | |
| *C09D 151/00* | (2006.01) | |
| *C08F 236/10* | (2006.01) | |
| *C08F 257/02* | (2006.01) | |
| *C08F 279/02* | (2006.01) | |
| *C08F 279/04* | (2006.01) | |
| *C08L 51/04* | (2006.01) | |
| *C08L 55/02* | (2006.01) | |
| *C09D 151/04* | (2006.01) | |
| *C09D 155/02* | (2006.01) | |
| *C09J 151/04* | (2006.01) | |
| *C09J 155/02* | (2006.01) | |
| *D21H 19/58* | (2006.01) | |

(52) U.S. Cl.
CPC ......... *C09D 151/00* (2013.01); *Y10T 428/2998* (2015.01); *C08F 236/10* (2013.01); *C08F 257/02* (2013.01); *C08F 279/02* (2013.01); *C08F 279/04* (2013.01); *C08L 51/04* (2013.01); *C08L 55/02* (2013.01); *C09D 151/04* (2013.01); *C09D 155/02* (2013.01); *C09J 151/04* (2013.01); *C09J 155/02* (2013.01); *D21H 19/58* (2013.01)

(58) Field of Classification Search
USPC ................................. 427/212, 213.3
See application file for complete search history.

(56) References Cited

U.S. PATENT DOCUMENTS

| | | | |
|---|---|---|---|
| 3,970,629 A * | 7/1976 | Izaki et al. ............ | 524/26 |
| 4,331,738 A | 5/1982 | Kuan ................. | 428/494 |
| 5,110,883 A * | 5/1992 | Gartner .............. | 526/84 |
| 5,585,184 A * | 12/1996 | Baker et al. .......... | 428/407 |
| 5,703,157 A | 12/1997 | Fujiwara et al. ....... | 524/822 |
| 5,770,303 A | 6/1998 | Weinert et al. ........ | 428/326 |
| 2002/0022696 A1 * | 2/2002 | Demirors et al. ....... | 525/191 |
| 2003/0105222 A1 * | 6/2003 | Choi et al. ........... | 524/801 |

FOREIGN PATENT DOCUMENTS

| | | |
|---|---|---|
| JP | 62117897 | 5/1987 |
| JP | 790798 | 4/1995 |
| WO | 0250373 A1 | 6/2002 |

OTHER PUBLICATIONS

PCT International Search Report; International Application No. PCT/KR2004/000279; International Filing Date: Feb. 12, 2004; Date of Mailing: May 27, 2004.
Supplemental European Search Report for application No. 04821822.6 dated Jun. 6, 2006.
European Office Action for application 04821822.6 dated Feb. 15, 2011.

* cited by examiner

*Primary Examiner* — Robert Vetere
(74) *Attorney, Agent, or Firm* — McKenna Long & Aldridge LLP

(57) ABSTRACT

The present invention relates to a method of manufacture of styrene-butadiene latexes. The styrene-butadiene latex according to the present invention is characterized by having a superior adhesive force as the formation of films at an early stage is promoted by adjusting the gel content and molecular weight of the outermost layer, as well as a fast ink-drying speed and a high air permeability as the formation of paper films is maintained. It may be applied to paper coating very stably since the mechanical stability and chemical stability of the latex are superior.

13 Claims, No Drawings

METHOD OF MANUFACTURE OF STYRENE-BUTADIENE LATEXES

TECHNICAL FIELD

The present invention relates to a method of manufacture of styrene-butadiene latexes. In more detail, the present invention relates to a method of manufacture of styrene-butadiene latexes characterized by that the adhesive force of latexes is superior by enhancing the formation of initial films during coating by adjusting the gel content and molecular weight of the outermost layer of styrene-butadiene latexes and having a fast speed of drying inks and a high air permeability by maintaining the formation of proper films. It is applicable very stably to paper coating since the mechanical and chemical stability of latexes are superior.

BACKGROUND ART

Generally, coated sheet of paper are manufactured by coating an inorganic pigment such as clay, calcium carbonate, aluminum hydroxide ($Al(OH)_3$), titanium oxide ($TiO_2$), etc. on paper, where a natural binder such as casein, starch, etc. or an artificial binder such as a styrene-butadiene latex, polyvinyl alcohol, acrylic latex, etc. is used for the adhesive since the above inorganic pigment does not have adhesive force. Presently, artificial synthetic binders are used mainly owing to their advantages in that it is easier to adjust their physical properties and it is more convenient to use them compared to natural binders. Among them, styrene-butadiene latexes that are not expensive but have a superior performance are used typically. When manufacturing a coating solution, various kinds of additives such as dispersion agents, thickner, insolublizer, etc. are used along with an inorganic pigment and a binder. Still, the most important chemicals are an inorganic pigment and a binder, which should be selected to obtain balanced physical properties of coated paper.

The most frequently used inorganic pigments are clay and calcium carbonate. Clay has a lamellar-type structure and is advantageous in that it is possible to obtain a high paper gloss and printing gloss but is disadvantageous in that it has a low fluidity but a large amount of demand for a binder. Whereas, in case of calcium carbonate, it is advantageous in view of its fluidity, adhesive force, ink acceptance, paper brightness, opacity, etc. but is problematic in that it is required to have a much greater chemical stability of the coating solution for the calcium ion.

Recently, there has been a movement to confront with the improvement of productivity and supply of printed matters by increasing the coating speed as the speed of manufacture of paper has been faster gradually. The coating speed of recent has been improved to be fast up to about 1,000~1,500 m/min. Such a fast coating speed implies a greater shearing force during coating, and therefore, the mechanical stability of latexes becomes more important. It is also required to have a high chemical stability of latexes since the amount of use of calcium carbonate is increased as the performance of calcium carbonate is increased while reducing the prime cost.

As described in the above, the stability of latexes may be classified into the chemical, mechanical, and thermal stability. And all of these three types of stability should be secured in order to secure a high-level stability.

It has been demanded more seriously to improve the adhesive force of binders as there has been recently a strong trend of reducing the content of a binder for improvement of the paper quality and cost reduction when manufacturing coated paper. Along with the above, it has been demanded greatly to improve the ink-drying speed due to a fast printing speed. If only these two physical properties are improved, it is possible to obtain coated paper that conform to the manufacturing and printing processes of coated paper of recent.

The adhesive force of coated paper is expressed while a binder to be inputted into the coating solution goes through the drying process and films are formed. The better the films are formed, the greater the adhesive force becomes. However, the ink-drying speed is lowered as the amount of air bubbles in the coating layer is reduced although the adhesive force is increased. It implies that the adhesive force and the ink-drying speed are somewhat inversely proportional physical properties, and therefore, it is very difficult to improve both of them by simple adjustment of the glass transition temperature, etc. of the latex.

As a result of studies conducted by the inventors of the present invention in order to improve simultaneously the adhesive force, ink-drying speed, air permeability, and stability of styrene-butadiene latexes, it is found that the above object may be achieved by controlling the gel content and molecular weight of the outermost layer of the shells in the multiple core-shell structure. In other words, it is found that it is possible to simultaneously improve the adhesive force, ink-drying speed, air permeability, and stability of latexes for paper coating by employing a general method of control of the gel content and molecular weight by inputting a chain transfer agent along with monomers for manufacturing of shells during the process of polymerization in order to coat the core with the shells and adjusting the gel content and molecular weight of the outermost layer of multiple shells by inputting a fixed amount of the chain transfer agent singly for a fixed amount of time at a proper rate of conversion after inputting of those monomers. The present invention is completed based on this finding.

DISCLOSURE OF THE INVENTION

An object of the present invention is, therefore, to simultaneously improve the adhesive force as well as ink-drying speed and stability of styrene-butadiene latexes in their manufacture.

Provided in the present invention is a method of manufacture of styrene-butadiene latexes comprised of a step of manufacture of the core latex of styrene-butadiene polymers; a step of multiple coating of shell polymers outside of the above core latex; and a step of adjusting the gel content and molecular weight of the outermost layer of the latex by singly adding a chain transfer agent after the above step of manufacture of shells.

The above-described core latex is manufactured through emulsion polymerization of a core composition comprised of styrene, 1,3-butadiene, an ethylenic unsaturated acid monomer, a cyanovinyl monomer, a monomer that may be copolymerized with the above, and a chain transfer agent. The above core composition is composed of 35 to 90 parts by weight of styrene, 10 to 55 parts by weight of 1,3-butadiene, 1 to 18 parts by weight of an ethylenic unsaturated acid monomer, 0.5 to 15 parts by weight of a cyanovinyl monomer, 1 to 25 parts by weight of a monomer that may be copolymerized, and 0.1 to 1.0 parts by weight of a chain transfer agent.

The above-described shell polymers are manufactured through emulsion polymerization of a shell composition comprised of styrene, 1,3-butadiene, an ethylenic unsaturated acid monomer, a cyanovinyl monomer, a monomer that may be copolymerized with the above, and a chain transfer agent. Particularly, they are composed of 30 to 80 parts by weight of styrene, 10 to 70 parts by weight of 1,3-butadiene, 0.5 to 18 parts by weight of the ethylenic unsaturated acid monomer, 1.0 to 20 parts by weight of the cyanovinyl monomer, 1.0 to 20 parts by weight of the monomer that may be copolymerized, and 0.1 to 5.0 parts by weight of the chain transfer agent.

The above-described chain transfer agent may be mercaptan having 7 to 16 carbon atoms, where its amount of use may be 0.05 to 5.0 parts by weight.

The above-described ethylenic unsaturated acid monomer may be one or more kinds of unsaturated carboxylic acids selected from a group of methacrylic acid, acrylic acid, itaconic acid, crotonic acid, fumaric acid, and maleic acid; or one or more kinds of unsaturated polycarboxylic acid alkyl esters having one or more carboxyl radicals selected from a group of itaconic acid monoethyl ester, fumaric acid monobutyl ester, and maleic acid monobutyl ester.

The above-described cyanovinyl monomer may be acrylonitrile or methacrylonitrile.

The above-described monomer that may be copolymerized may be one or more kinds of compounds selected from a group of unsaturated carboxylic acid alkyl esters which may be methyl acrylate, methyl methacrylate, ethyl acrylate, ethyl methacrylate, butyl acrylate, or butyl methacrylate; unsaturated carboxylic acid hydroxyalkyl esters which may be β-hydroxyethyl acrylate, β-hydroypropyl acrylate, or β-hydroxyethyl methacrylate; unsaturated carboxylic acid amides which may be acrylamide, methacrylamide, itaconamide, or maleic acid monoamide, or their derivatives; and aromatic vinyl monomers which may be α-methylstyrene, vinyl toluene, or P-methylstyrene.

Also presented in the present invention is a method of manufacture of styrene-butadiene latexes characterized by that the gel content of the above final styrene-butadiene latex is 30 to 90%. The glass transition temperature of the above core latex is −10 to 50° C., and that of the above shell polymer is −20 to 40° C. The average particle diameter of the above core latex is 40 to 90 nm, and that of the final styrene-butadiene latex manufactured in the above is 130 to 260 nm.

Further, presented in the present invention is a styrene-butadiene latex manufactured according to the above method of manufacture of styrene-butadiene latexes.

Still further, a paper coating solution composition including the styrene-butadiene latex manufactured in the above method of manufacture of styrene-butadiene latexes is provided in the present invention.

The present invention still yet provides for paper coated with a coating solution composition including the styrene-butadiene latex manufactured according to the above method of manufacture of styrene-butadiene latexes as well as a styrene-butadiene latex having a structure in which styrene-butadiene polymers are coated multiply onto the outside of the above core latex of the styrene-butadiene polymers as the shell polymers in the styrene-butadiene latex.

BEST MODE FOR CARRYING OUT THE INVENTION

The styrene-butadiene latex of the present invention includes a multiple core-shell polymerization step. In more detail, the present invention is comprised of the first step of manufacture of the core and second step of formation of the core-shell in which multiple layers of shells having different compositions are coated onto the core, where each process is accomplished through emulsion polymerization. There may be one or more shells, preferably 2 to 4 shells, and each shell should be designed to have a proper core-shell structure with the glass transition temperature, gel content, molecular weight, etc. taken into consideration. The third step is a step of input of a fixed amount of a chain transfer agent singly for a fixed amount of time when the conversion ratio is 60 to 95% after the multiple shell polymerization is completed. It is a required step for adjusting the gel content and molecular weight of the outermost layer of latex particles. It is preferable that the amount of input of the chain transfer agent is 0.05 to 5.0 parts by weight with respect to 100 parts by weight of the total monomers inputted.

The core manufactured through the above first step is characterized by having a proper hydrophilicity along with a proper gel content compared to the final latex. In the second-step polymerization, it is characterized by having a proper glass transition temperature and a high gel content in case of being used for sheet offset or a low gel content in case of being used for web offset.

The method of manufacture of styrene-butadiene latexes according to the present invention is illustrated in more detail below:

The first step is a process for initial polymerization of the core, which is comprised of 35 to 90 parts by weight of styrene, 10 to 55 parts by weight of 1,3-butadiene, 1 to 18 parts by weight of an ethylenic unsaturated acid monomer, 0.5 to 15 parts by weight of a cyanovinyl monomer, 1 to 25 parts by weight of a monomer that may be copolymerized with the above, and 0.1 to 1.0 parts by weight of a chain transfer agent.

The above-described styrene is a material giving a proper hardness and waterproofing to the copolymer. If less than 35 parts by weight of styrene is included in the monomer, it is not possible to obtain a sufficient hardness and waterproofing; and if its amount exceeds 90 parts by weight, its adhesive force and film-formation ability are lowered.

The above-described 1,3-butadiene gives plasticity to the copolymer. If the amount of 1,3-butadiene is less than 10 parts by weight, the copolymer may become too hard; and if its amount exceeds 55 parts by weight, stiffness may be lowered.

The above-described ethylenic unsaturated acid monomer is used properly in order to improve the adhesive force of the copolymer as well as the stability of latex particles. It is preferable that its compositional ratio is 1 to 18 parts by weight. If its amount is less than 1 part by weight, it may not be possible to obtain the above effects; and if its amount exceeds 18 parts by weight, there may occur problems with the stability of polymerization, etc. It is also preferable that it is an unsaturated carboxylic acid or an unsaturated polycarboxylic acid alkyl ester having one or more carboxyl radicals.

It is preferable that the above-described unsaturated carboxylic acid is one or more acids selected from a group of methacrylic acid, acrylic acid, itaconic acid, crotonic acid, fumaric acid, and maleic acid. And it is preferable that the above-described unsaturated polycarboxylic acid alkyl ester is one or more kinds of esters selected from a group of itaconic acid monoethyl ester, fumaric acid monobutyl ester, and maleic acid monobutyl ester.

The above-described cyanovinyl monomer is to improve printing gloss. It is preferable that its content is 3 to 10 parts by weight. It is also preferable to adjust the hydrophilicity of the cyanovinyl monomer according to each step of polymerization within a desirable range since it has a high hydrophilicity along with the ethylenic unsaturated acid monomer. It is further preferable that the above cyanovinyl monomer is acrylonitrile or methacrylonitrile.

Next, it is preferable that the above-described monomer that may be copolymerized is one or more compounds selected from a group of unsaturated carboxylic acid alkyl esters such as methylacrylate, methylmethacrylate, ethylacrylate, ethylmethacrylate, butylacrylate, butylmethacrylate, etc.; unsaturated carboxylic acid hydroxyalkyl esters such as β-hydroxyethyl acrylate, β-hydroxypropyl acrylate, β-hydroxyethyl methacrylate, etc.; unsaturated carboxlic acid amides and their derivatives such as acrylamide, methacrylamide, itaconamide, maleic acid monoamide, etc.; and aromatic vinyl monomers such as α-methylstyrene, vinyl toluene, P-methylstyrene, etc. the above unsaturated carboxylic acid alkyl ester gives a proper hardness to the copolymer and improves the film-formation ability. It is preferable that its content is 3 to 15 parts by weight since negative affects to its waterproofing may be caused if its content exceeds 25 parts by weight. Also, the above unsaturated carboxylic acid amide and its derivative are effective for improving the chemical stability, mechanical stability, and waterproofing of the copolymer latex. It is more preferable that its content is 1 to 10 parts by weight.

It is preferable that the chain transfer agent used for the present invention is selected from a group of mercaptans having 7 to 16 carbon atoms, more preferably selected from n-dodecyl mercaptan and t-dodecyl mercaptan.

The core of the present invention is manufactured in terms of a usual emulsion polymerization reaction by adding additives such as general polymerization initiation agents, emulsifiers, electrolytes, etc. to the above core composition. It is preferable that the gel content of the latex core of the present invention is 80 weight % or less, particularly, 40 to 70 weight %. If the gel content of the core exceeds 80 weight %, it may become difficult to control its structure in polymerization in the second step and further after the step of manufacture of the core and it is difficult to form the multiple core-shell structure.

The second step among the steps of manufacture of the latexes of the present invention is a step of coating shells onto the core latex manufactured in the above first step. The shell composition is comprised of 30 to 80 parts by weight of styrene, 10 to 70 parts by weight of 1,3-butadiene, 0.5 to 18 parts by weight of an ethylenic unsaturated acid monomer, and 0.1 to 5.0 parts by weight of a chain transfer agent. Also included may be 1.0 to 20 parts by weight of a cyanovinyl monomer and 1.0 to 20 parts by weight of another monomer that may be polymerized with other monomers.

It is preferable that the gel content of multiple shells manufactured in the second step of the present invention is 30 to 90 weight %, more preferably, 60-85 weight % in case of being used for sheet offset or 40 to 60 weight % in case of being used for web offset. In case of being used for sheet offset, if the gel content of the shells manufactured in the second step is less than 60 weight %, the adhesive force, ink-drying speed, and latex stability may be lowered; and if it is greater than 85 weight %, it may be difficult to secure the adhesive force. In case of being used for web offset, if the gel content of the shells manufactured in the second step is less than 20 weight %, the adhesive force and latex stability may be lowered; and if it exceeds 70 weight %, blistering resistance characteristics are lowered.

Manufacture of core-multiple shells, which is in the second step among the steps of manufacture of latexes of the present invention is done through polymerization by inputting a new monomer mixture when the conversion ratio of monomers to polymers is at a level of 55 to 95% in the previous step. If the conversion ratio to polymers in the previous step is less than 55%, it is difficult to obtain an effective multiple core-shell structure since monomers in the previous step and those of the shells in the next step are mixed and not separated clearly. Each monomer that may be used in the above second step is the same as the raw material used in the step of manufacture of the core in the first step.

The first step of manufacture of the latex of the present invention includes a step of input of a fixed amount of a chain transfer agent singly for a fixed amount of time after the multiple shell polymerization step is completed as the monomers for the final shell polymerization are inputted. This step is a very important step for adjusting the gel content and molecular weight of the final latex. A proper conversion ratio after input of monomers for the final shell polymerization is completed is 60 to 95%. If the conversion ratio is less than 60% or greater than 95%, it is difficult to demonstrate the effect of control of the gel content and molecular weight of the outermost layer through a chain transfer agent inputted. It is preferable that the amount of time of input is for 2 hours immediately after input of monomers for the final shell polymerization is completed, more preferably, for 1 hour immediately after input of them is completed. It is preferable that the amount of input of the above chain transfer agent is 0.05 to 5.0 parts by weight, more preferably, 0.1 to 1.0 parts by weight.

In the manufacture of the latex of the present invention, it is important to have the thickness of each shell and glass transition temperature properly in the second step of polymerization of multiple shells. The thickness of each shell may be controlled by adjusting the content of the core and monomers. If they are not controlled properly, it is not possible to obtain the latex having a desirable structure. Physical properties such as the adhesive force, ink-drying speed, latex stability, etc. may be also controlled by properly controlling the glass transition temperature, gel content, and molecular weight in each process.

As to the proper thickness during the manufacture of the latex of the present invention, it is preferable that the average particle diameter after core polymerization in the first step is 40 to 90 nm, and that after the final shell polymerization is 110 to 260 nm.

Also, during the manufacture of the latex of the present invention, it is preferable that a proper glass transition temperature of the first-step seed is −10 to 50° C., and the glass transition temperature of multiple shells is −20 to 40° C. As to the cases that the temperature is beyond the range presented in the above, it is not possible to have desired physical properties such as gloss, etc. if the glass transition temperature is −20° C. or lower, and it is not possible to have desirable physical properties such as adhesive force, etc. if it exceeds 40° C. Such physical properties are met only within the temperature range presented.

The styrene-butadiene latex of the present invention may be mixed with an organic or inorganic pigment, thickner, or other additives to manufacture an aqueous coating solution, which may be used for the manufacture of coated paper as it is coated onto paper. The above inorganic pigments may include general pigments and extenders such as titanium oxide, calcium carbonate, clay, etc. It is preferable that the content of the latex is 5 to 20 parts by weight with respect to 100 parts by weight of the solids of the aqueous coating solution.

The foregoing and other objects, aspects, and advantages will be better understood from the following detailed description of preferred embodiments of the invention, but it is to be distinctly understood that the invention is not limited thereto:

EXAMPLES 1 THROUGH 9

The styrene-butadiene latexes of the present invention are manufactured in three steps as follows:

Step 1: A Step of Manufacture of the Core

A 10-L pressurized reactor at which a mixer, thermometer, cooler, and inlet of nitrogen gas are installed and which is equipped to have monomers, emulsifier, and polymerization initiation agent be inputted continuously is substituted with nitrogen gas, after which 33 parts by weight of butadiene, 49 parts by weight of styrene, 8 parts by weight of methyl methacrylate, 5 parts by weight of acrylonitrile, 5 parts by weight of itaconic acid, 6 parts by weight of dodecyl dibenzene sodium sulfonate, 0.3 parts by weight of t-dodecyl mercaptan, 0.4 parts by weight of sodium bicarbonate, and 420 parts by weight of ion exchange water are put into, and heated up to 60° C. To this mixture, 0.8 parts by weight of potassium persulfate, which is a polymerization initiation agent, is put into and mixed for about 300 minutes in order to complete polymerization of the seed.

The results of measurement of the above core with a laser scattering analyzer (Nicomp) shows that the average particle diameter is 68 nm, gel content is 53%, and conversion ratio is 97%.

Step 2: A Step of Manufacture of Multiple Shells

In order to coat the core obtained in the above Step 1 with shells, 8 parts by weight of the core latex and 30 parts by weight of ion exchange water are put into the reactor again and heated up to 80° C. Thereafter, a shell composition having proper constituents, i.e., a shell composition comprised of 50 parts by weight of styrene, 30 parts by weight of 1,3-butadiene, 10 parts by weight of an ethylenic unsaturated acid monomer, 3 parts by weight of a chain transfer agent, 11 parts by weight of a cyanovinyl monomer, and 100 parts by weight of another monomer that may be polymerized with other monomers, is inputted for emulsion polymerization. In Preferred Embodiments 1 and 2, the number of shells is 2; and in Preferred Embodiments 3 through 9, the number of shells is 3. The sum of monomers of the shell composition inputted at that time is 100, and the conversion ratio after all of components is inputted is 70 to 90%.

Step 3: A Step of Adjustment of the Gel Content and Molecular Weight of the Outermost Layer In order to adjust the gel content and molecular weight of the outermost layer by singly inputting a chain transfer agent to the latex obtained in Step 2, the temperature of the reactor in which the components in Step 2 are filled is maintained at 80° C., and the components in Step 3 of the above Table 1 are put into continuously and polymerized for 30 minutes.

In Preferred Embodiments 6 through 9, the component in the above Table 1 is inputted singly after the second shell is manufactured in Step 2, and the third shell is manufactured. Thereafter, Step 3 is progressed.

Polymerization is completed by additional mixing for 100 minutes while accelerating the reaction by increasing the temperature up to 90° C. after all of the above components is inputted. The conversion ratio of the completely polymerized latex is 98 to 100%, and the average particle diameter is measured to be 180 nm.

COMPARATIVE EXAMPLE 1

A core-shell latex having 2 shells is manufactured in the same method as those in Steps 1 and 2 in Preferred Embodiments 1 and 2. And the amount of a chain transfer agent is adjusted when manufacturing the shells in Step 2 instead of having no Step 3 in order to control the final gel content to be almost the same as those in preferred embodiments.

COMPARATIVE EXAMPLE 2

A core-shell latex having 3 shells is manufactured in the same method as those in Steps 1 and 2 in Preferred Embodiments 3 through 5. As in Comparative Example 1, the amount of a chain transfer agent is adjusted when manufacturing the shells in Step 2 in order to control the final gel content to be almost the same as those in preferred embodiments.

COMPARATIVE EXAMPLES 3 THROUGH 6

A core-shell latex having 3 shells is manufactured in the same method as those in Steps 1 and 2 in Preferred Embodiments 6 through 9. As in Preferred Embodiments 6 through 9, after the second shell is manufactured, the third shell is manufactured after inputting the chain transfer agent singly for 30 minutes as shown in Table 2 below: Also, the amount of the chain transfer agent is adjusted when manufacturing the shells in Step 2 in order to control the final gel content to be almost the same as those in preferred embodiments.

TABLE 1

| Classification | | Examples | | | | | | | | |
| --- | --- | --- | --- | --- | --- | --- | --- | --- | --- | --- |
| | | 1 | 2 | 3 | 4 | 5 | 6 | 7 | 8 | 9 |
| Number of Shells | | 2 | 2 | 3 | 3 | 3 | 3 | 3 | 3 | 3 |
| Step 2 (after manufacture of the 2nd shell) | t-dodecyl mercaptan | — | — | — | — | — | 0.2 | 0.1 | 0.3 | 0.2 |
| | n-dodecyl mercaptan | — | — | — | — | — | — | 0.2 | — | 0.2 |
| Step 3 | t-dodecyl mercaptan | 0.3 | 0.2 | 0.3 | 0.2 | 0.1 | 0.3 | 0.3 | 0.3 | 0.3 |
| | n-dodecyl mercaptan | — | 0.2 | — | 0.2 | 0.4 | — | — | — | — |
| Physical properties of latex | Gel content | 78.2 | 80.3 | 81.5 | 79.6 | 82.0 | 80.1 | 79.8 | 78.3 | 79.1 |
| | Glass transition temperature | 2.3 | 1.6 | 3.2 | 2.6 | 1.9 | 2.8 | 3.3 | 3.3 | 2.4 |

TABLE 2

| Classification | | Comparative Examples | | | | | |
| --- | --- | --- | --- | --- | --- | --- | --- |
| | | 1 | 2 | 3 | 4 | 5 | 6 |
| Number of shells | | 2 | 3 | 3 | 3 | 3 | 3 |
| Step 2 (after manufacture of the 2nd shell) | t-dodecyl mercaptan | — | — | 0.2 | 0.1 | 0.3 | 0.2 |
| | n-dodecyl mercaptan | — | — | — | 0.2 | — | 0.2 |

TEST EXAMPLE 1

In order to measure the mechanical stability of the latex, the latex is measured singly by using a Maron tester. And in order to simultaneously measure its chemical and mechanical stability, a coating color in which the latex and an artificial pigment are mixed (refer to Test Example 2 below) is manufactured and measured by using a Maron tester. For the results of measurement of the stability, after the Maron test is completed, the latex and coating color are filtered with a 325-mesh filter, and the aggregate is measured in a unit of ppm.

TABLE 3

|  | Examples |  |  |  |  |  |  |  |  |
| --- | --- | --- | --- | --- | --- | --- | --- | --- | --- |
|  | 1 | 2 | 3 | 4 | 5 | 6 | 7 | 8 | 9 |
| Latex (ppm) | 684 | 712 | 546 | 552 | 580 | 694 | 660 | 752 | 724 |
| Coating color (ppm) | 540 | 566 | 308 | 372 | 355 | 412 | 465 | 492 | 455 |

|  | Comparative Examples |  |  |  |  |  |
| --- | --- | --- | --- | --- | --- | --- |
|  | 1 | 2 | 3 | 4 | 5 | 6 |
| Latex (ppm) | 1464 | 1223 | 1512 | 1443 | 1632 | 1559 |
| Coating color (ppm) | 8312 | 4655 | 5103 | 4955 | 5250 | 5164 |

By performing the Maron test of the latex, it is possible to measure the mechanical stability of the latex itself. If the stability of the latex is destroyed by a strong force from outside, the latex is solidified and shown as an aggregate. Therefore, its mechanical stability is more superior as the content of the aggregate is smaller. And as is seen in the above Table 3, preferred embodiments have more superior mechanical stability than comparative examples do. Also, in case that the coating color is measured with a Maron tester, not only mechanical stability but also chemical stability work according to the action of calcium ions in the coating color, and accordingly, preferred embodiments have more superior stability than comparative examples do.

TEST EXAMPLE 2

In order to compare and evaluate the latexes in preferred embodiments and comparative examples, a paper coating solution having 64 parts by weight of solids comprised of 30 parts by weight of clay (primary), 70 parts by weight of calcium carbonate, 12 parts by weight of the latex, 0.8 parts by weight of a thickner, and 1.2 parts by weight of another additive is manufactured. Coated paper are manufactured by coating both sides of sheets of paper with 15 $g/m^2$ of the paper coating solution thus manufactured in terms of passive both-side rod coating (Rod Coating, No. 7), which are then dried at 105° C. for 30 seconds, and are passed through a super-calender twice (at a passing speed of 4 m/min) at 80° C. under 40 kg/cm.

For physical properties of coated paper manufactured in the above, their adhesive force, ink-drying speed, and air permeability are measured. The methods of measurement are shown below and the results are described in Table 4:

The adhesive force is measured in terms of the 5-point method by printing coated paper several times using an RI printer and determining the degree of tear-off with naked eyes. A higher score shows a better adhesive force, and the average value is obtained by measuring the adhesive force using inks of tech-value 12, 14, and 16.

As to the ink-drying speed, the degree of smearing of an ink according to the time is measured according to the 5-point method after printing coated paper with an RI printer. A higher score means a faster ink-drying speed.

An average value of air permeability is obtained by measuring many parts of coated paper with an OKEN porosimeter, where the values mean the time taken for the air of unit volume to pass through coated paper. A smaller value means a faster passage of the air, which further implies that the air permeability of coated layers is superior that much. The unit is in second.

TABLE 4

|  | Examples |  |  |  |  |  |  |  |  |
| --- | --- | --- | --- | --- | --- | --- | --- | --- | --- |
|  | 1 | 2 | 3 | 4 | 5 | 6 | 7 | 8 | 9 |
| Adhesive force | 3.8 | 3.7 | 4.3 | 4.1 | 4.1 | 4.1 | 4.1 | 4.0 | 3.9 |
| Ink-drying speed | 3.8 | 3.8 | 4.0 | 4.1 | 4.3 | 4.0 | 4.0 | 4.1 | 4.2 |
| Air permeability | 1724 | 1688 | 1354 | 1332 | 1289 | 1265 | 1221 | 1203 | 1165 |

|  | Comparative Examples |  |  |  |  |  |
| --- | --- | --- | --- | --- | --- | --- |
|  | 1 | 2 | 3 | 4 | 5 | 6 |
| Adhesive force | 3.5 | 3.9 | 3.8 | 3.8 | 3.8 | 3.7 |
| Ink-drying speed | 3.6 | 3.8 | 3.8 | 3.9 | 3.9 | 3.9 |
| Air permeability | 1935 | 1490 | 1412 | 1388 | 1360 | 1337 |

As shown in Table 4 in the above, the results of measurement of physical properties of the coating solution and coated paper and of printing show that the latex of the double core-shell structure in Preferred Embodiments 1 and 2 shows more superior adhesive force as well as ink-drying speed and air permeability characteristic compared to those in Comparative Example 1 having no input of a chain transfer agent after the manufacture of the double shells; and likewise, the latex of the triple core-shell structure in Preferred Embodiments 3 through 5, in which the gel content and molecular weight of the outermost layer is adjusted by inputting singly a chain transfer agent after the manufacture of the shells, shows more superior adhesive force as well as very superior ink-drying speed and air permeability characteristic compared to those of the latex of the triple core-shell structure in Comparative Example 2.

Further, it is shown that, in case of Comparative Examples 3 through 6 where the gel content and molecular weight are adjusted during the manufacture of the shells by inputting singly a chain transfer agent after coating the second shell in the process of coating the triple shells, the ink-drying speed and air permeability are improved somewhat but not greatly superior physical properties are obtained on the whole compared to those in Comparative Example 2. And as in cases of Preferred Embodiments 6 through 9, in case that the gel content and molecular weight of the outermost layer are adjusted by inputting singly a chain transfer agent after the manufacture of the last and third shell, superior adhesive force as well as ink-drying speed and air permeability are obtained.

INDUSTRIAL APPLICABILITY

The styrene-butadiene latex according to the present invention is characterized by having a superior adhesive force as the formation of films at an early stage is promoted by adjusting the gel content and molecular weight of the outermost layer, as well as a fast ink-drying speed and a high air permeability as the formation of paper films is maintained. It may be applied to paper coating very stably since the mechanical stability and chemical stability of the latex are superior.

While certain present preferred embodiments of the invention have been shown and described, it is to be distinctly understood that the invention is not limited thereto but may be otherwise variously embodied and practiced within the scope of the following claims.

What is claimed is:

1. A method of manufacture of a styrene-butadiene latex comprising:
   manufacturing a core latex of styrene-butadiene polymers having a gel content of 80% or less through emulsion polymerization with a chain transfer agent;
   adding monomers and the chain transfer agent to the core latex when a conversion ratio in the manufacturing of the core latex is 55 to 95% to polymerize monomers on the core latex through emulsion polymerization to prepare shell polymers, wherein a number of shell polymers is two or three; and
   adding the chain transfer agent alone for 30 min to 2 hr when a conversion ratio of an outermost layer is 60 to 95% during a polymerization step of the outermost layer of the shell polymers to select a gel content and a molecular weight of the outermost layer of the latex and then additionally polymerizing under 80 to 90° C. to prepare the styrene-butadiene latex having the conversion ratio of 98 to 100%,
   wherein the chain transfer agent is one or more selected from the group consisting of n-dodecyl mercaptan and t-dodecyl mercaptan.

2. The method of manufacture of a styrene-butadiene latex according to claim 1, wherein said latex is manufactured through emulsion polymerization of a core composition comprised of styrene, 1,3-butadiene, an ethylenic unsaturated acid monomer, a cyanovinyl monomer, a monomer copolymerizable with said monomers, and the chain transfer agent.

3. The method of manufacture of a styrene-butadiene latex according to claim 2, wherein said core composition is comprised of 35 to 90 parts by weight of styrene, 10 to 55 parts by weight of 1,3-butadiene, 1 to 18 parts by weight of the ethylenic unsaturated acid monomer, 0.5 to 15 parts by weight of the cyanovinyl monomer, 1 to 25 parts by weight of the monomer copolymerizable with said monomers, and 0.1 to 1.0 parts by weight of the chain transfer agent.

4. The method of manufacture of a styrene-butadiene latex according to claim 2, wherein said ethylenic unsaturated acid monomer is:
   one or more kinds of unsaturated carboxylic acids selected from a group of methacrylic acid, acrylic acid, itaconic acid, crotonic acid, fumaric acid, and maleic acid; or
   one or more kinds of unsaturated polycarboxylic acid alkyl esters having one or more carboxyl radicals selected from a group of itaconic acid monoethyl ester, fumaric acid monobutyl ester, and maleic acid monobutyl ester.

5. The method of manufacture of a styrene-butadiene latex of claim 2, wherein said cyanovinyl monomer is acrylonitrile or methacrylonitrile.

6. The method of manufacture of a styrene-butadiene latex according to claim 2, wherein said monomer copolymerizable with said monomers is one or more compounds selected from the group consisting of:
   unsaturated carboxylic acid alkyl esters of methyl acrylate, methyl methacrylate, ethyl acrylate, ethyl methacrylate, butyl acrylate, or butyl methacrylate;
   unsaturated carboxylic acid hydroxyalkyl esters of β-hydroxyethyl acrylate, β-hydroxypropyl acrylate, or β-hydroxyethyl methacrylate;
   unsaturated carboxylic acid amides of acrylamide, methacrylamide, itaconamide, or maleic acid monoamide, or their derivatives; and
   aromatic vinyl monomers of a-methylstyrene, vinyl toluene, or P-methylstyrene.

7. The method of manufacture of a styrene-butadiene latex according to claim 1, wherein said shell polymers are manufactured through emulsion polymerization of a shell composition comprised of styrene, 1,3-butadiene, an ethylenic unsaturated acid monomer, a cyanovinyl monomer, a monomer copolymerizable with said monomers, and the chain transfer agent.

8. The method of manufacture of a styrene-butadiene latex according to claim 7, wherein said shell composition is comprised of 30 to 80 parts by weight of styrene, 10 to 70 parts by weight of 1,3-butadiene, 0.5 to 18 parts by weight of an ethylenic unsaturated acid monomer, 1.0 to 20 parts by weight of a cyanovinyl monomer, 1.0 to 20 parts by weight of a monomer copolymerizable with said monomers, and 0.1 to 5.0 parts by weight of the chain transfer agent.

9. The method of manufacture of a styrene-butadiene latex according to claim 1, wherein said chain transfer agent is mercaptan having 7 to 16 carbon atoms.

10. The method of manufacture of a styrene-butadiene latex according to claim 1, wherein the amount of use of said chain transfer agent is 0.05 to 5.0 parts by weight.

11. The method of manufacture of a styrene-butadiene latex according to claim 1, wherein the gel content of said styrene-butadiene latex manufactured finally is 30 to 90%.

12. The method of manufacture of a styrene-butadiene latex according to claim 1, wherein the glass transition temperature of said core latex is −10 to 50° C., and the glass transition temperature of said shell polymers is −20 to 40° C.

13. The method of manufacture of a styrene-butadiene latex according to claim 1, wherein the average particle diameter of said core latex is 40 to 90 nm, and the average particle diameter of said styrene-butadiene latex manufactured finally is 130 to 260 nm.

* * * * *